United States Patent
Birman et al.

(10) Patent No.: US 10,611,241 B1
(45) Date of Patent: Apr. 7, 2020

(54) POINTER CAP ILLUMINATION

(71) Applicant: Continental Automotive Systems, Inc., Auburn Hills, MI (US)

(72) Inventors: Vyacheslav Birman, Auburn Hills, MI (US); Enrique Chavez, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/190,741

(22) Filed: Nov. 14, 2018

(51) Int. Cl.
| F21V 21/00 | (2006.01) |
| B60K 35/00 | (2006.01) |
| F21V 3/06 | (2018.01) |
| F21V 3/10 | (2018.01) |
| F21Y 115/10 | (2016.01) |

(52) U.S. Cl.
CPC .............. B60K 35/00 (2013.01); F21V 3/062 (2018.02); F21V 3/10 (2018.02); *B60K 2370/33* (2019.05); *F21Y 2115/10* (2016.08)

(58) Field of Classification Search
CPC .......... F21V 3/10; F21V 3/062; B60Q 35/00; B60Q 2370/33
USPC .......... 362/23.12, 23.07, 23.08, 23.09, 23.1, 362/23.11, 23.16, 23.17, 23.2, 23.22
See application file for complete search history.

(56) References Cited

U.S. PATENT DOCUMENTS

| 4,274,358 | A | * | 6/1981 | Nakamura | B60K 37/02 116/288 |
| 5,142,456 | A | * | 8/1992 | Murphy | G01D 11/28 116/288 |
| 5,291,851 | A | * | 3/1994 | Muramatsu | B60K 35/00 116/286 |
| 6,302,552 | B1 | * | 10/2001 | Ross | G02B 6/001 116/288 |
| 6,408,784 | B1 | * | 6/2002 | Ross | G01D 11/28 116/288 |
| 7,534,000 | B1 | * | 5/2009 | Adachi | B60K 35/00 362/23.01 |
| 8,517,548 | B2 | * | 8/2013 | Kato | G01D 11/28 362/23.01 |
| 2006/0238993 | A1 | * | 10/2006 | Obata | G01D 11/28 362/23.13 |

FOREIGN PATENT DOCUMENTS

DE        102005053742 A1 *  7/2007  .............. B60Q 3/14

* cited by examiner

Primary Examiner — Laura K Tso

(57) ABSTRACT

An illuminated pointer cap for an vehicle instrument panel outputs different colors from a white light source by directing the white light through different color filters. The white light is transmitted through a light-conductive substrate and reflected to the color filters by triangular-shaped undercuts formed in one side of the substrate that is opposite the color filters.

8 Claims, 5 Drawing Sheets

POINTER CAP ILLUMINATION

BACKGROUND

Many vehicle instrument clusters use multi-colored displays for a variety of reasons. Providing multiple colors on an instrument cluster, however, requires corresponding colored light sources. An instrument panel display that provides multiple different colors but using a single white light source would be an improvement over the prior art.

DETAILED DESCRIPTION

Figure 1:
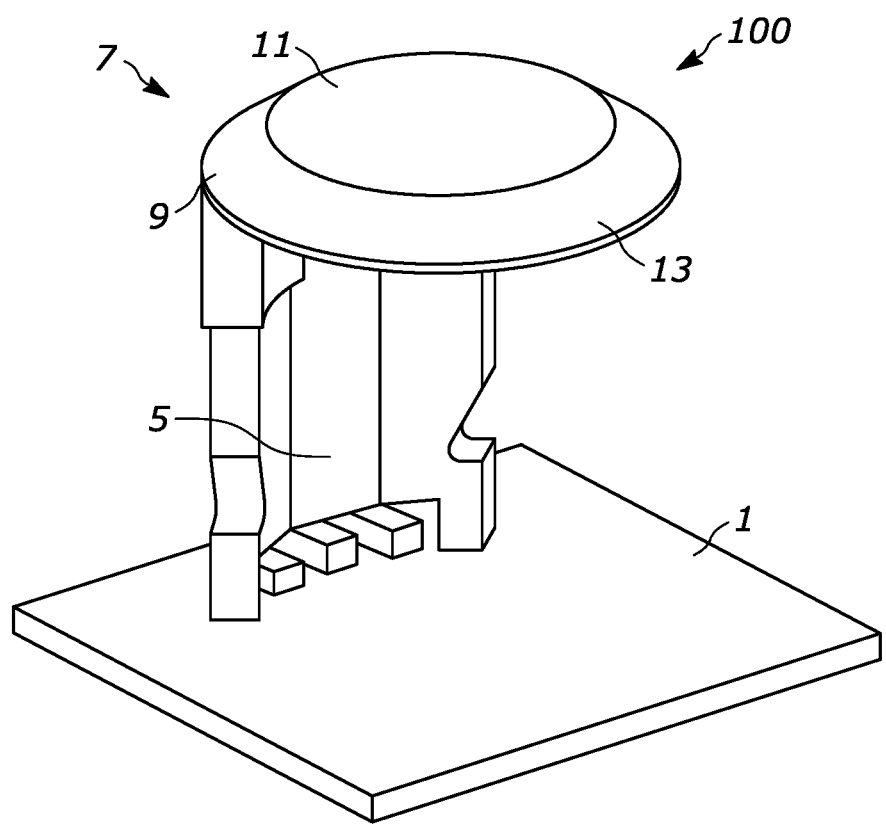
FIG. 1 is a perspective view of an instrument panel display device, e.g., a tachometer, which provides a multi-color light output, the colors of which are obtained from a single, white light source.

FIG. 1 is a perspective view of a multi-color display 100 for an instrument panel. In FIG. 1, the device is a tachometer. The display device 100 comprises a circuit board 1, which supports a single white light emitting diode (LED) above which is a unitary light-transmissive acrylic "substrate" that is comprised of a "post portion" 5 and a "planar portion" 7.

The display has a multi-color light output from the top surface 11 of the planar portion 7, the planar portion 7 being supported by and attached to a post portion 5. The top surface 11 has a beveled peripheral edge 13, the outside corner of which is identified by reference numeral 9.

Figure 2:
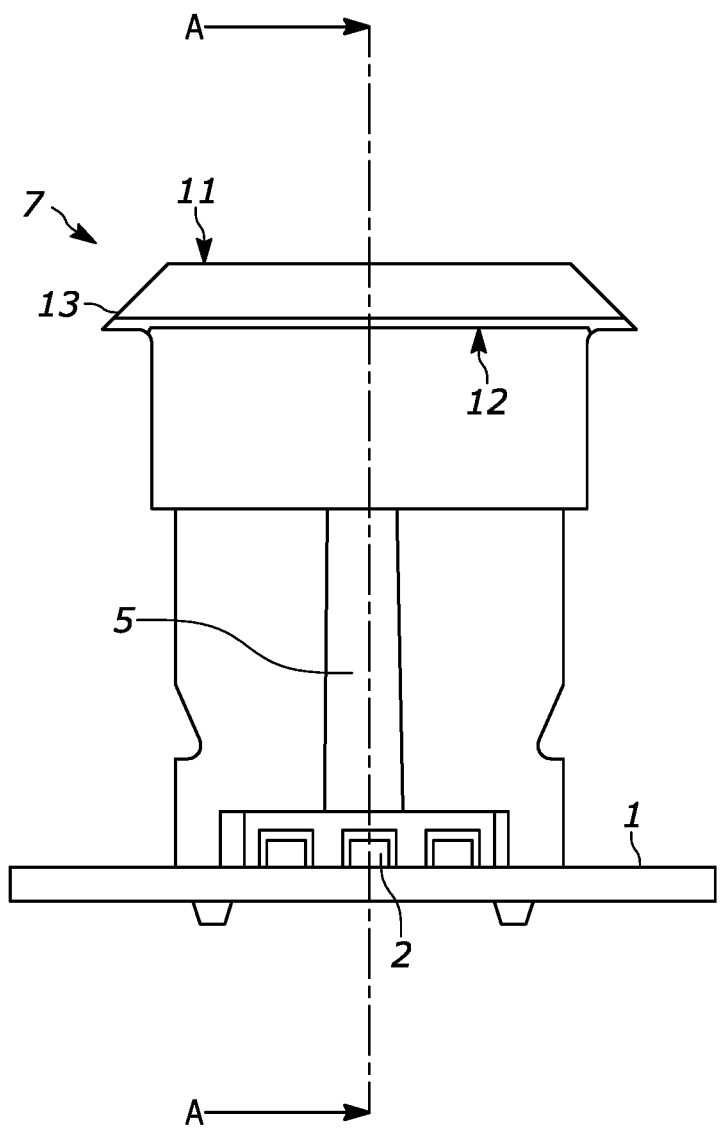
FIG. 2 is a "top" view of the display device shown in FIG. 1.

FIG. 2 is a top view of the device shown in FIG. 1. The planar portion 7 has a top surface 11 and an opposing bottom surface 12. The post portion 5 and the planar portion 7 are a unitary structure made of a light-transmissive acrylic or a polycarbonate. As used herein, the post portion 5 and the planar portion 7 are considered to be a light-transmissive acrylic or polycarbonate substrate, which is optically coupled to the white light source 2, which is attached to the circuit board 1.

Figure 3:
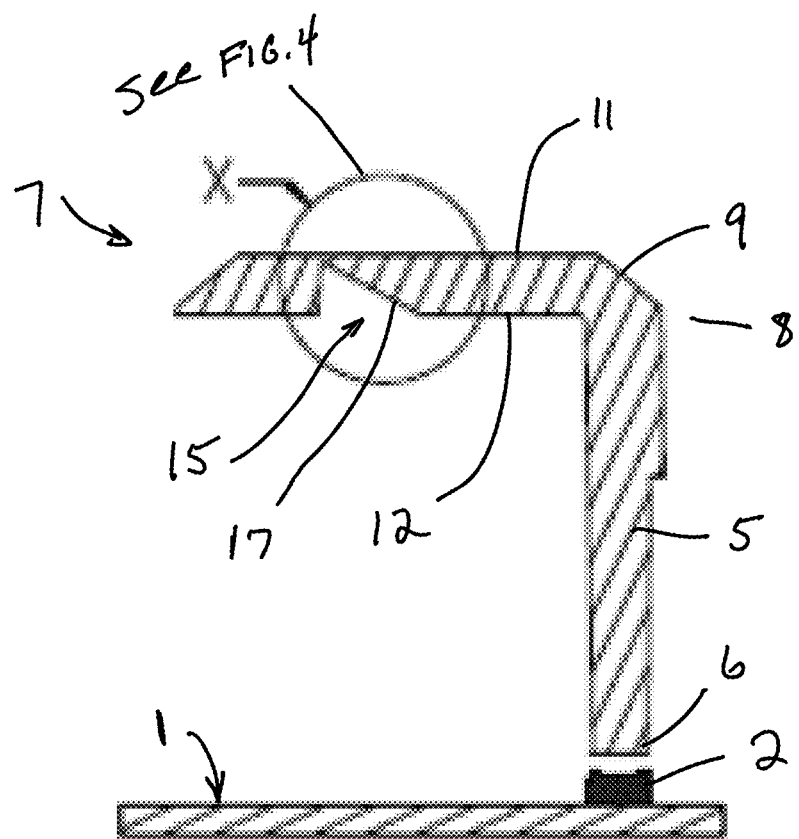
FIG. 3 is a sectional view of the device shown in FIG. 1 and FIG. 2 through section lines A-A.

FIG. 3 is a sectional view of the device shown in FIG. 1 and FIG. 2 taken through section lines A-A. The post portion 5 is essentially a column, i.e. it is considered herein to be substantially columnar. It has a first end 6 directly above the white light source 2. An opposing second end 8 has the beveled outside corner 9 and is a contiguous or unitary structure with the planar portion 7. Since the columnar post portion 5 and the planar portion 7 are a unitary structure and made from a light-transmissive acrylic, light that is emitted from the light source 2 is coupled into the substantially planar first end of the post portion 5, travels upwardly through the post portion 5 and is reflected by the beveled outside corner sideways or laterally into the planar portion 7.

Still referring to FIG. 3, the planar portion 7 is provided with an undercut 15 which is essentially a triangular-shaped cut formed into the lower or bottom surface 12 of the planar portion 7. The undercut 15 has a hypotenuse 17 which extends into the planar portion 7 and which is inclined toward the top or second surface 11 at a predetermined angle 21 relative to the bottom surface 12 and horizontal. The hypotenuse side of the undercut reflects light travelling through the planar portion upwardly and toward the top surface 11.

Figure 4:
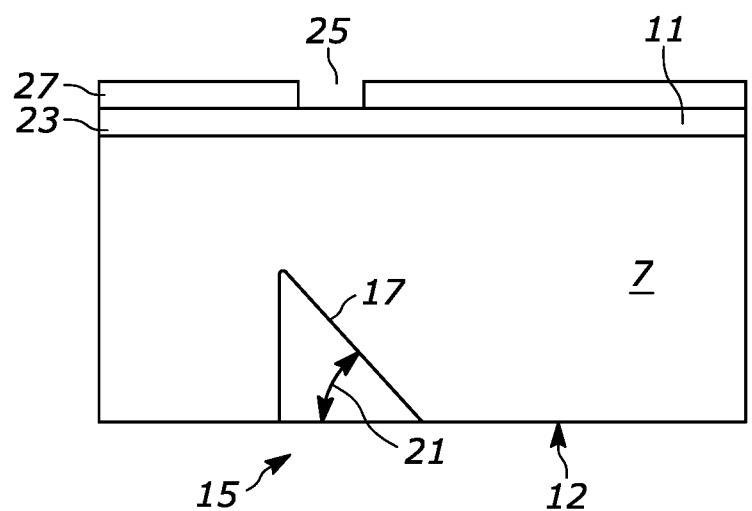
FIG. 4 is an isolated view of a portion of the display device shown in FIGS. 1-3.

Referring now to FIG. 4, an isolated view of the undercut and adjacent areas of the planar portion 7 are shown in greater detail. The top surface 11 of the planar portion 7 is coated with a high refractive index coating 23. A black matrix layer 27 coats the high refractive index coating layer 23. A window 25 is cut or etched through the black matrix layer 27 but does not extend through the high refractive index coating layer 23.

The window 25 is located in the black matrix layer 27 over the hypotenuse 17 of the undercut 15. Light from the white light source 2 thus travels upwardly through the post portion 5, is reflected by the beveled outside corner 9, travels through the planar portion 7, is reflected by the hypotenuse 17 and emitted through the window 25.

Figure 5:
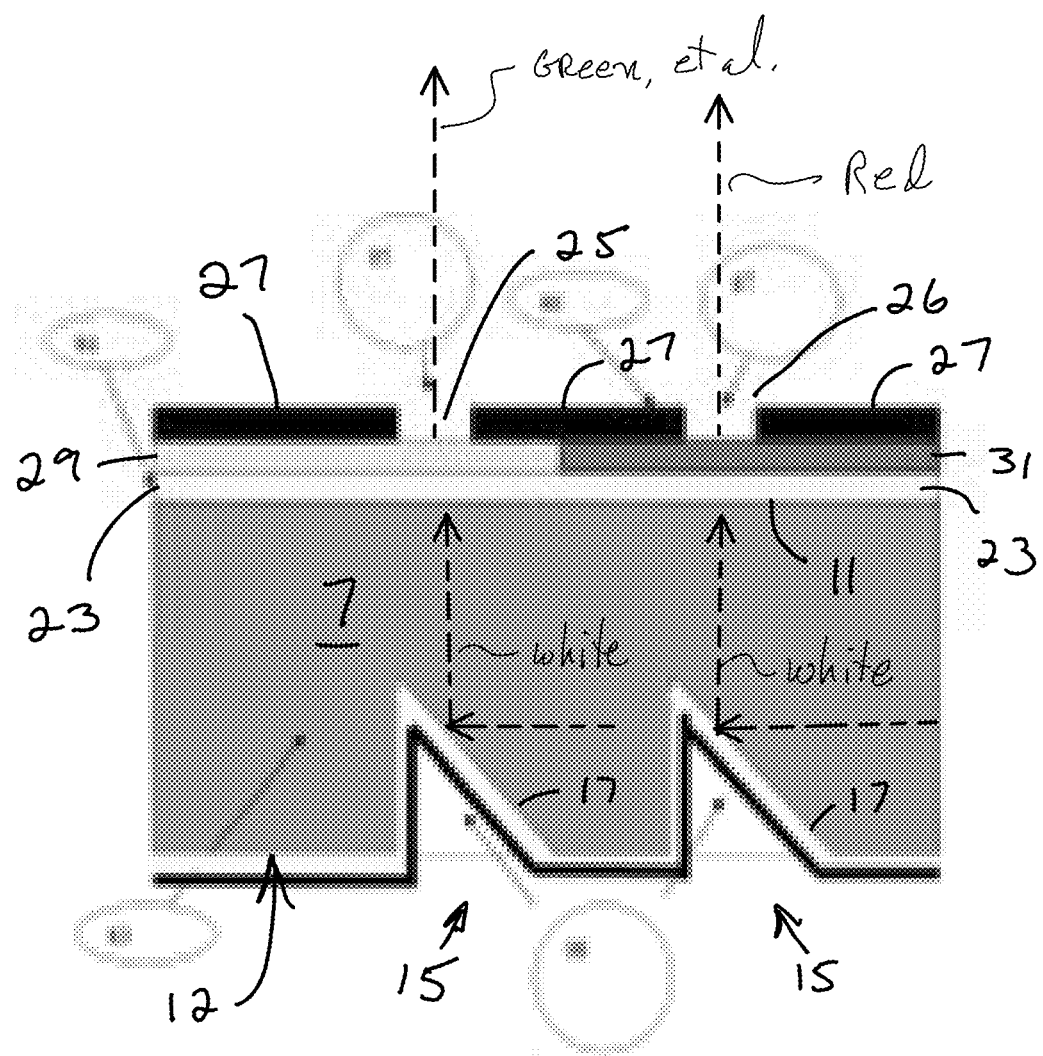
FIG. 5 is an isolated view of an alternate embodiment of the device shown in FIGS. 1-3.

Referring now to FIG. 5, a multi-color illuminated pointer cap for an in-vehicle instrument panel is shown. The embodiment shown in FIG. 5 differs from that shown in FIG. 4 by the addition of two triangular undercuts 15 and a high refractive index over both the top and bottom surfaces of the planar portion 7. The embodiment shown in FIG. 5 also differs from that shown in FIG. 4 by the addition of two windows 25 and 26 formed in the black matrix layer 27, the window 25 being above a first color filter layer 29, the second window 26 being above a second color filter layer 31. Both color filter layers are over the high refractive index coating 23, which is above the top surface 11 of the planar portion 7.

In addition, the hypotenuse surfaces of the undercut are also coated with the same high refractive index coating 23.

In operation, white light emitted from the white light source 2 travels up the post portion 5, is reflected laterally by the beveled edge, which is also preferably coated by the high refractive index coating 23. The white light is reflected sideways or laterally into the planar portion where it strikes the inclined hypotenuse surfaces, both of which are coated. The light from the two hypotenuse sides is reflected upwardly and is projected through the differently colored filters thereby providing differently-colored light from the instrument 100 shown in FIG. 1.

As used herein, the term high-refractive index coating is a material which has a refractive index greater than about 1.3 but up to about 1.8 and higher. In the preferred embodiment, the white light source is a white light emitting diode. In an alternate embodiment, the high-refractive index coating is replaced by a white paint. The black matrix layer 27 can be a black paint. The windows can be formed by a laser etching or abraiding.

The foregoing description is for purposes of illustration only. The true scope of the invention is set forth in the following claims.

What is claimed is:

1. An illuminated pointer cap for a vehicle instrument panel and which outputs different colors from a white light source, the illuminated pointer cap comprising:
    a white light source;
    a light-transmissive substrate optically coupled to the light source and comprising:
        a planar portion having a top surface, an opposing bottom surface and a peripheral edge, and
        a substantially columnar post portion having a first end optically coupled to and receiving light from the white light source, the post portion having an opposing second end, which is unitary with the planar portion, has a beveled outside corner and which is optically coupled to the planar portion edge such that white light from the white light source enters the first end of the post portion, travels through the post portion to the beveled outside corner and is reflected by the surface of the beveled outside corner into the peripheral edge of the planar portion wherein the white light is re-reflected between the top and bottom opposing surfaces;

a substantially triangular-shaped undercut formed into the bottom surface of the planar portion, the substantially triangular-shaped undercut having a hypotenuse side, which extends into the planar portion and inclined toward the top surface at a predetermined first angle relative to the bottom surface such that white light propagated into the planar portion from the peripheral edge travels through the planar portion of an acrylic substrate, impinges on the hypotenuse side of the undercut and is reflected from the hypotenuse side toward the top surface;

a high-refractive index coating over the top surface, over the bottom surface and over the hypotenuse side of the undercut;

a first color filter layer over a first portion of the high-refractive index coating that is on the top surface; and a second color filter layer over a second portion of the high-refractive index coating that is on the top surface;

a black matrix layer over the high-refractive index coating that is over the top surface and over at least part of the first and second color filter layers;

a first color window formed in the black matrix layer that is located over the first color filter layer; and a second color window formed in the black matrix layer that is located over the second color filter layer;

wherein white light from the light source propagates into and through the post portion, is reflected into the planar portion, reflected off the hypotenuse side of the undercut and passes through the first and second color windows as first and second different-color visible lights.

2. The illuminated pointer cap of claim 1, wherein the light-transmissive substrate is an acrylic.

3. The illuminated pointer cap of claim 1, wherein the light-transmissive substrate is a polycarbonate.

4. The illuminated pointer cap of claim 1, wherein the high-refractive index coating is white paint.

5. The illuminated pointer cap of claim 1, wherein the black matrix layer is black paint.

6. The illuminated pointer cap of claim 1, wherein the substantially triangular-shaped undercut formed into the bottom surface of the planar portion comprises a plurality of substantially triangular-shaped undercuts, each undercut having a hypotenuse side, which extends into the planar portion and which is inclined toward the top surface at a predetermined first angle relative to the bottom surface such that white light propagated into the planar portion from the peripheral edge travels through the planar portion of an acrylic substrate, impinges on the hypotenuse sides of the undercuts and is reflected from the hypotenuse sides toward the first and second color windows.

7. The illuminated pointer cap of claim 1, wherein the high-refractive index coating has a refractive index greater than about 1.3.

8. The illuminated pointer cap of claim 1, wherein the light source is a white light-emitting diode.

\* \* \* \* \*